U S 0 0 6 3 6 7 0 7 7 B 1

United States Patent
Brodersen et al.

(10) Patent No.: US 6,367,077 B1
(45) Date of Patent: *Apr. 2, 2002

(54) METHOD OF UPGRADING A SOFTWARE APPLICATION IN THE PRESENCE OF USER MODIFICATIONS

(75) Inventors: Robert S. Brodersen, Redwood City; John L. Coker, Hillsborough; Mark C Hastings, Palo Alto, all of CA (US)

(73) Assignee: Siebel Systems, Inc., San Mateo, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/377,892

(22) Filed: Aug. 19, 1999

Related U.S. Application Data

(63) Continuation of application No. PCT/US98/03575, filed on Feb. 24, 1998.
(60) Provisional application No. 60/039,467, filed on Feb. 27, 1997.

(51) Int. Cl.[7] .............................................. G06F 9/445
(52) U.S. Cl. ...................... 717/170; 717/169; 717/175; 707/511
(58) Field of Search ........................... 717/11, 168, 169, 717/170, 174, 175; 707/511

(56) References Cited

U.S. PATENT DOCUMENTS

| | | | |
|---|---|---|---|
| 4,558,413 A | 12/1985 | Schmidt et al. ............. 364/300 |
| 4,809,170 A | 2/1989 | Leblang et al. ............. 364/200 |
| 5,481,722 A | 1/1996 | Skinner ...................... 395/700 |
| 5,493,682 A | 2/1996 | Tyra et al. .................. 395/700 |
| 5,504,879 A | * 4/1996 | Eisenberg et al. .......... 395/600 |
| 5,574,898 A | 11/1996 | Leblang et al. ............. 395/601 |
| 5,809,287 A | * 9/1998 | Stupek, Jr. et al. ...... 395/500.43 |
| 5,970,490 A | * 10/1999 | Morgenstern ................. 707/10 |

FOREIGN PATENT DOCUMENTS

EP     0 498 130     10/1991     ............. G06F/9/44

OTHER PUBLICATIONS

IBM Technical Disclosure Bulletin, "Strategy for Collecting Software Inventory Information Across a Local Area Network", vol. 37, No. 12, pp. 275–276, Dec. 1994.*

* cited by examiner

Primary Examiner—Tuan Q. Dam
Assistant Examiner—Ted T. Vo
(74) Attorney, Agent, or Firm—James W. Soong; Cooley Godward, LLP

(57) ABSTRACT

A method for upgrading (31-b of FIG. 1) a software application (35-b) from a prior version to a subsequent version while preserving user modifications to the prior application. The method includes comparing differences between the two versions of the software applications. This is followed by enumerating the differences between the two versions of the software applications; and determining which differences between the two versions of the software are conflicting and which are compatible. The compatible changes are made (7). Also disclosed is an article of manufacture containing computer readable program code for carrying out the above process, and a program storage device carrying the code.

20 Claims, 8 Drawing Sheets

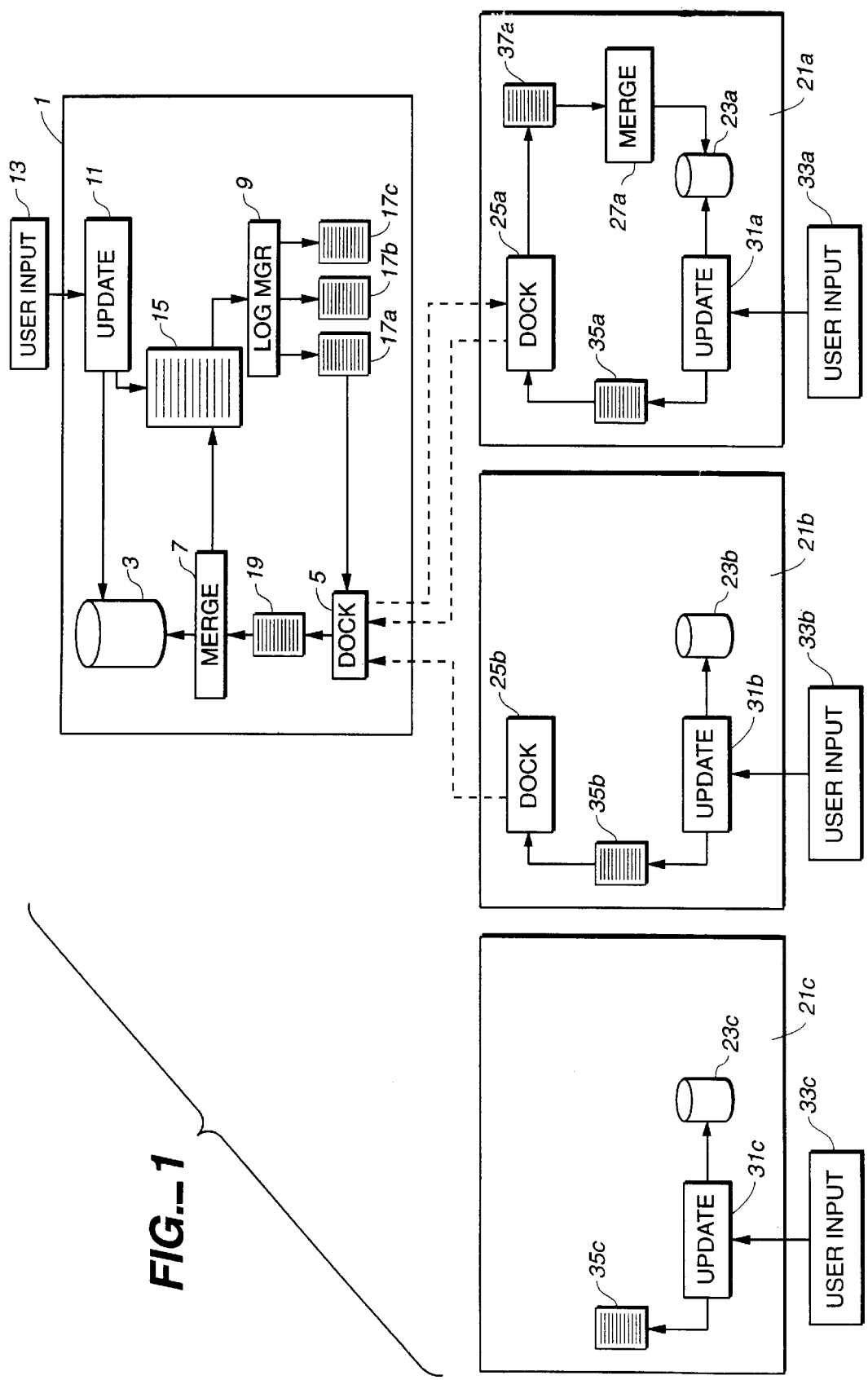
FIG._1

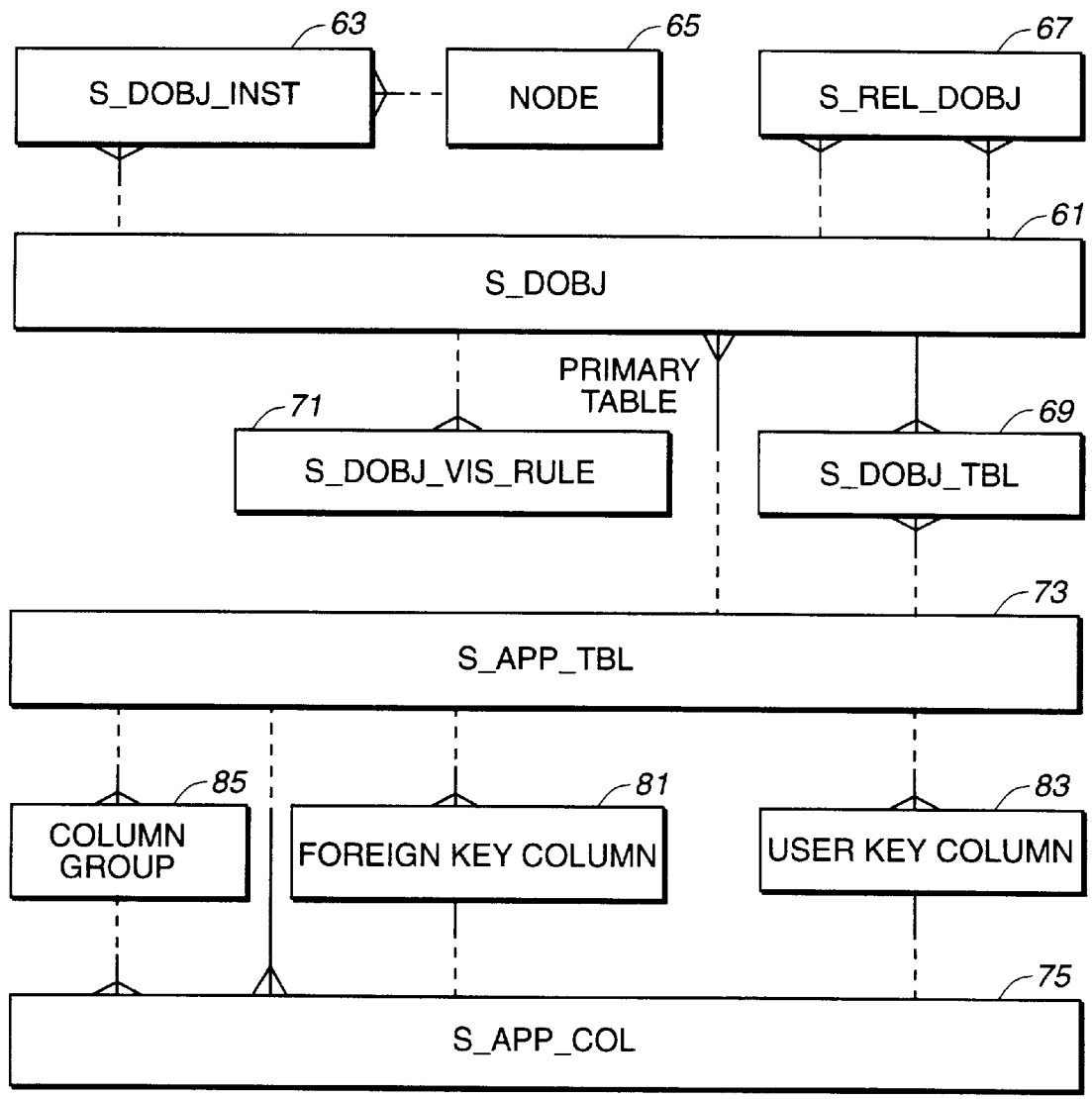
FIG._2

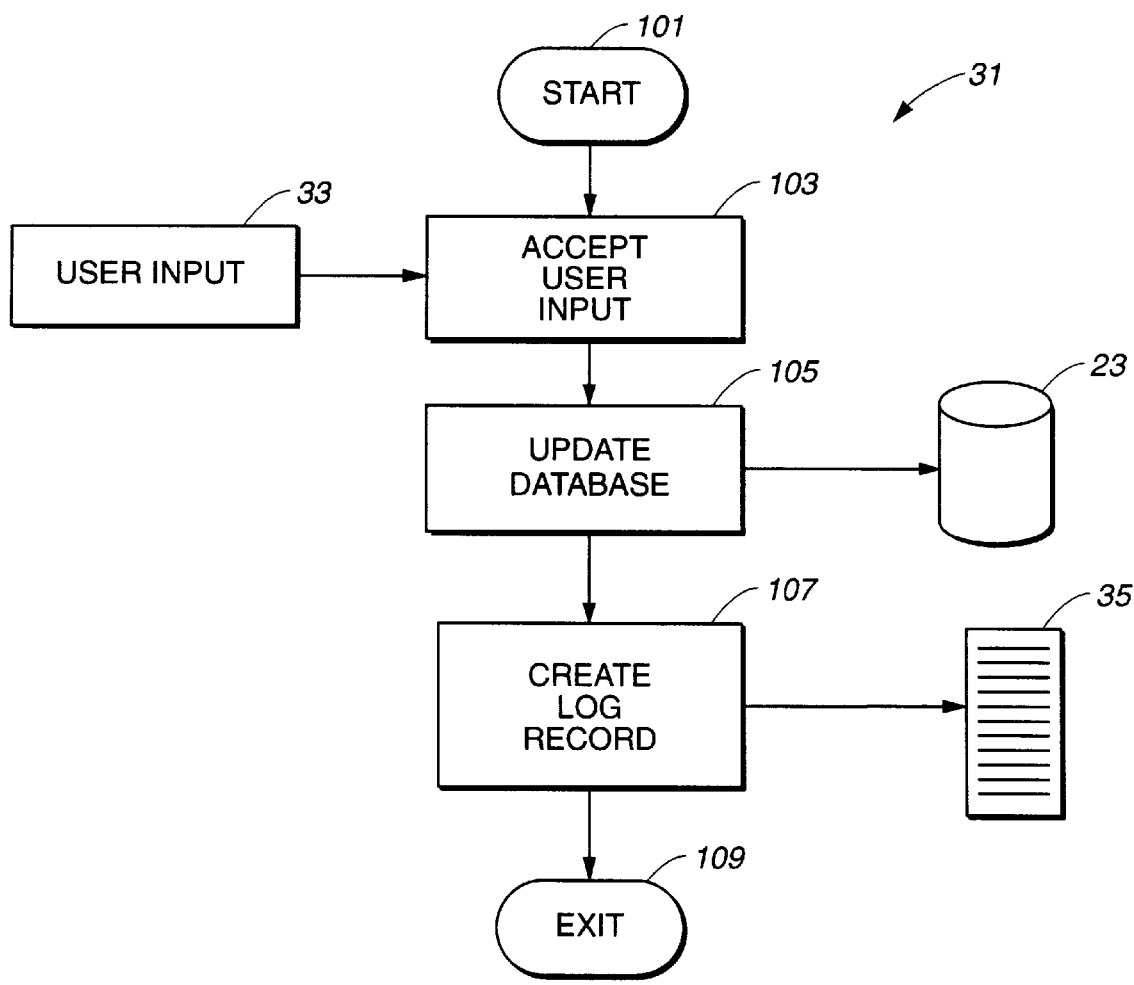
FIG._3

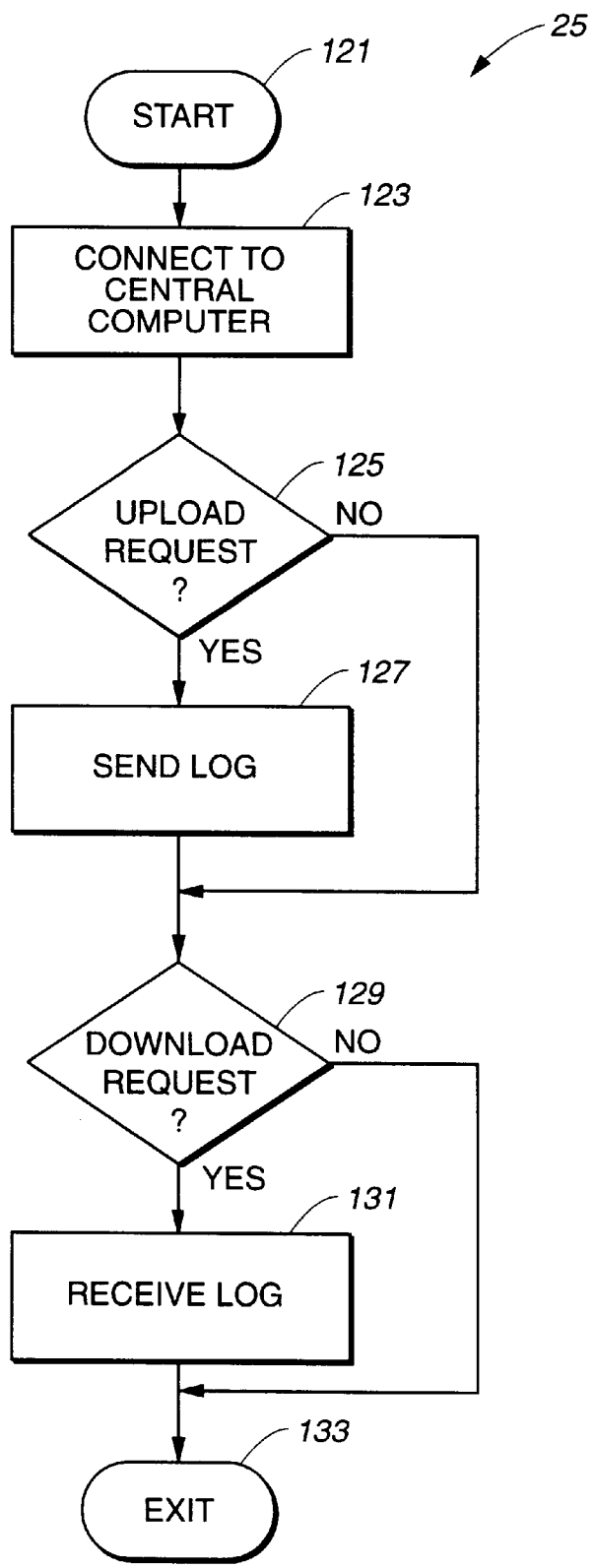
FIG._4

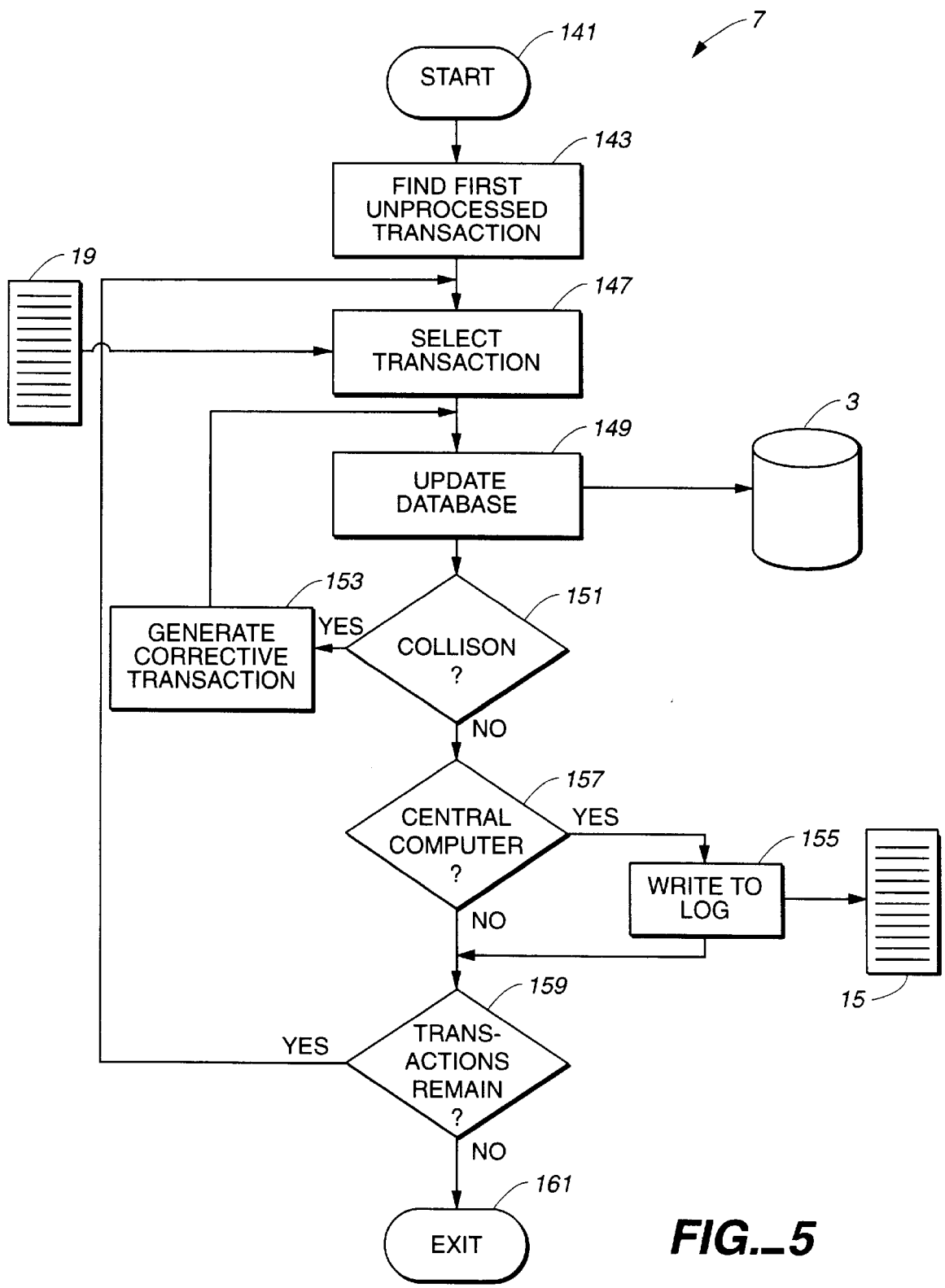
FIG._5

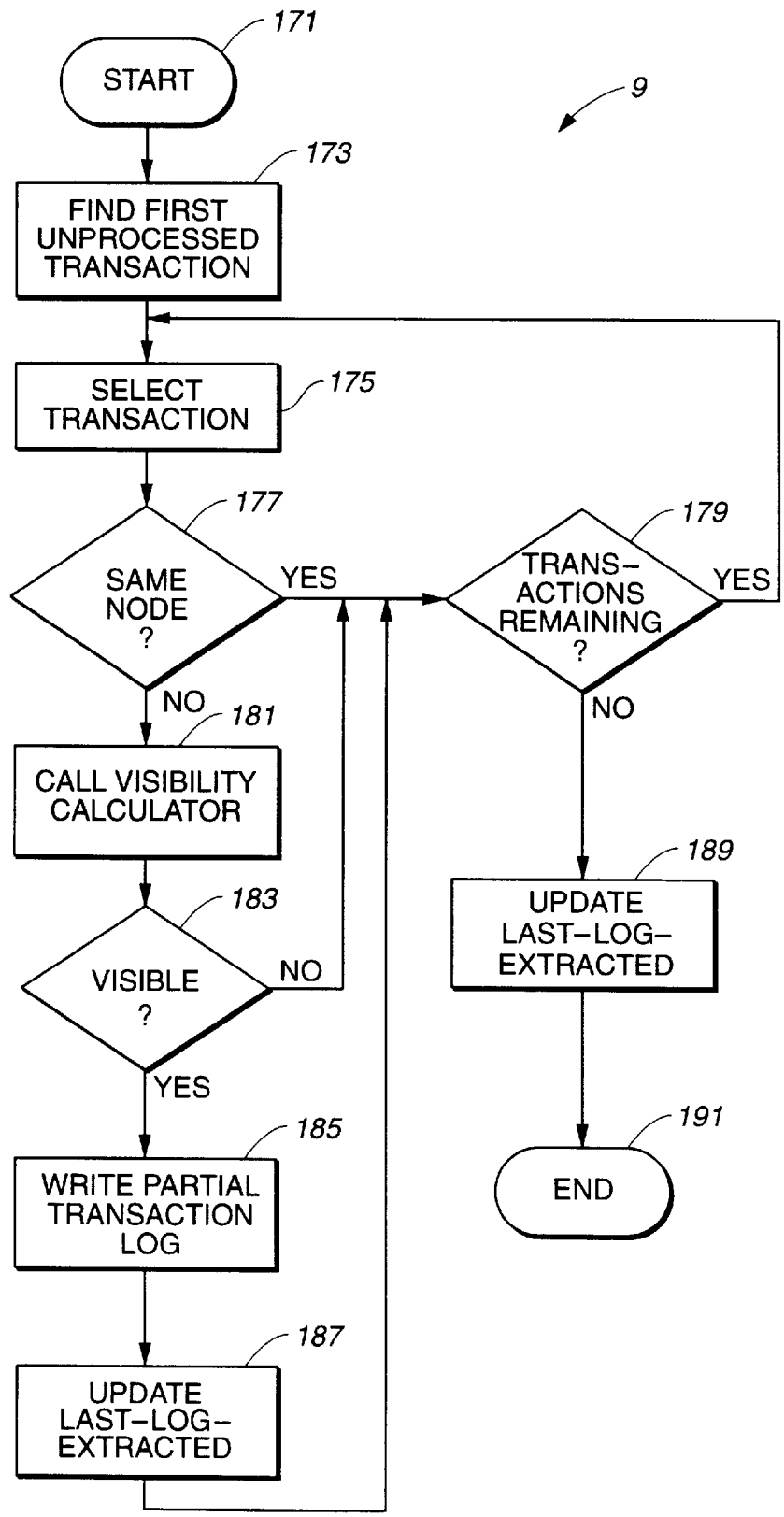
FIG._6

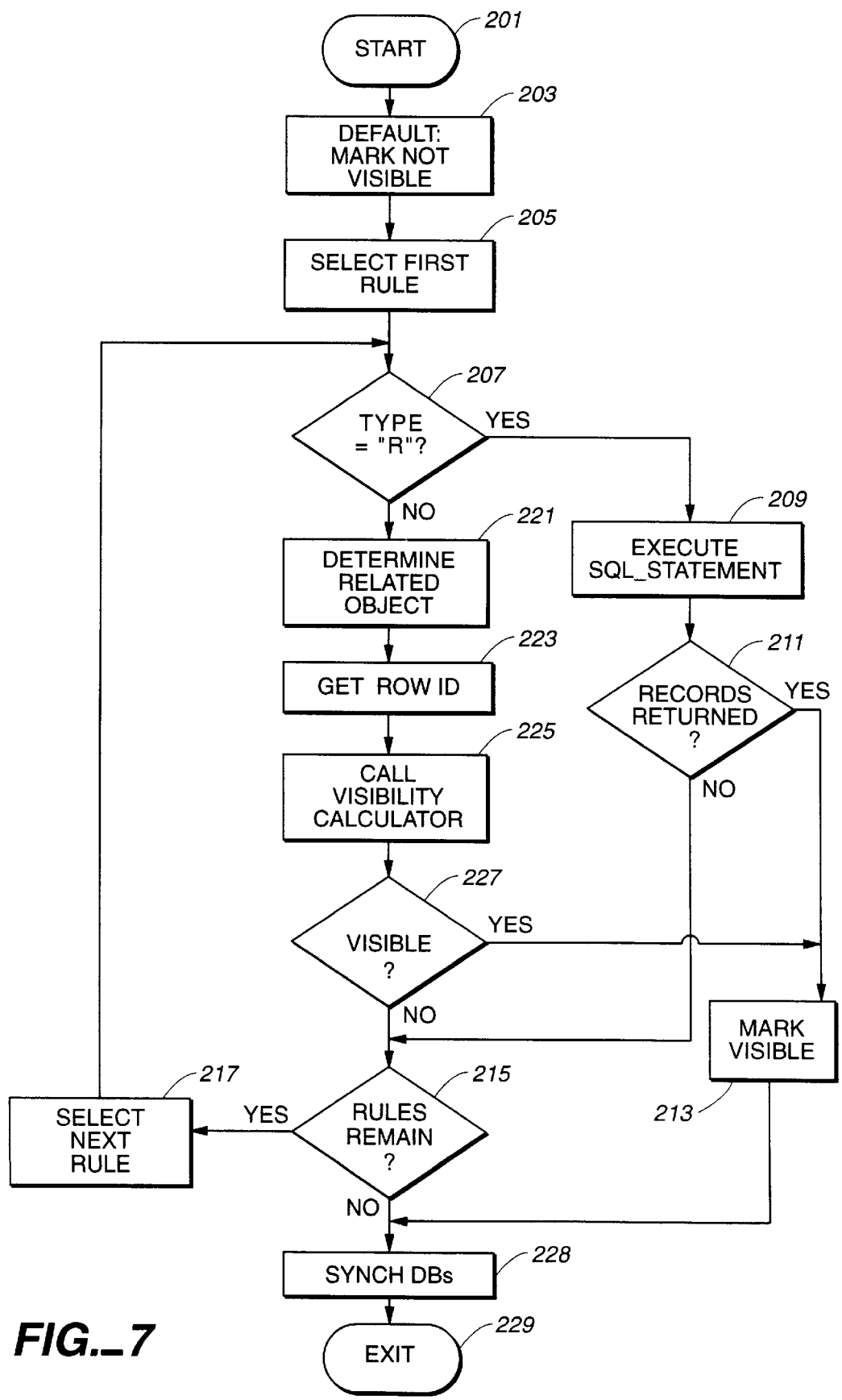
FIG._7

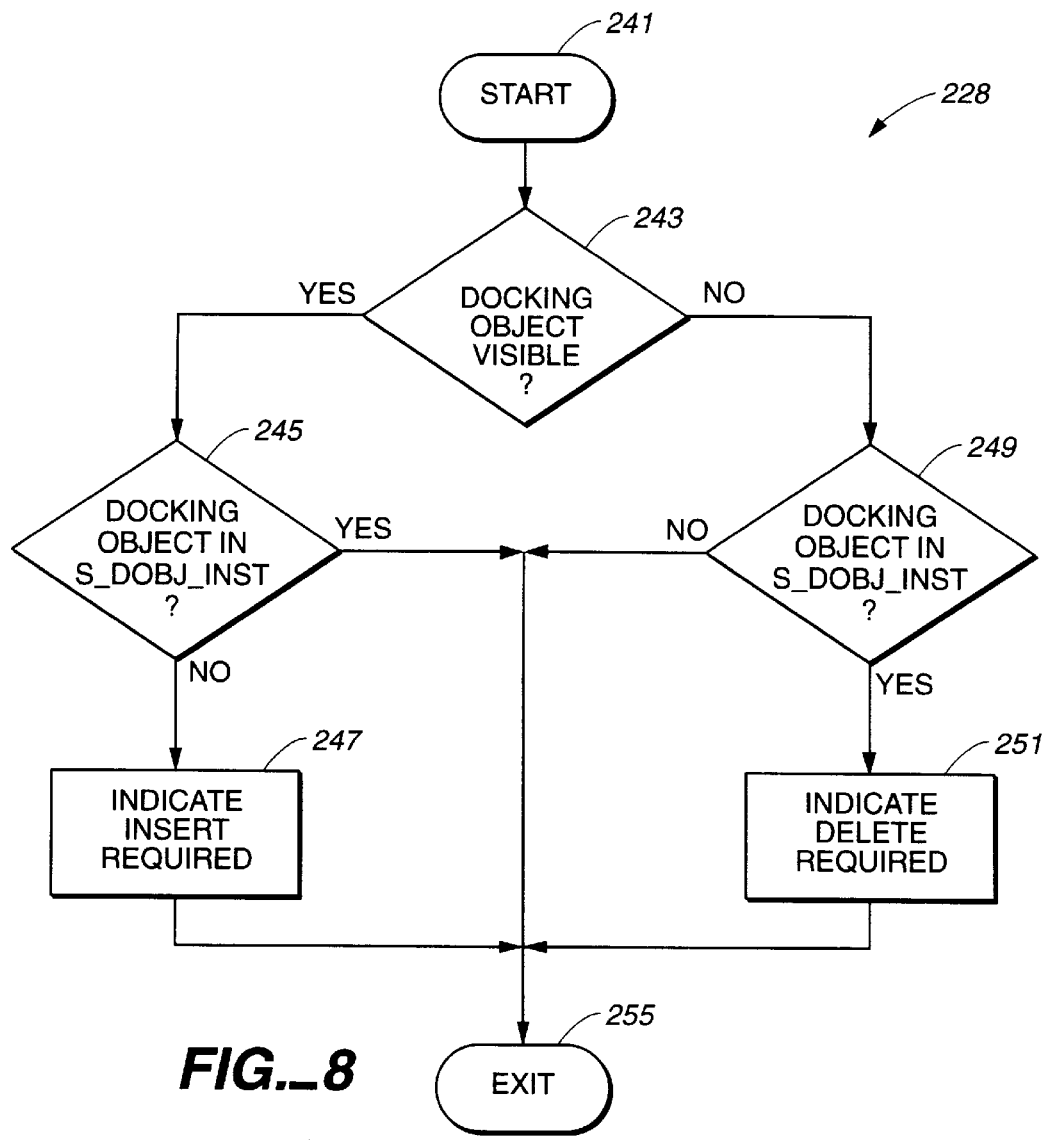
FIG._8
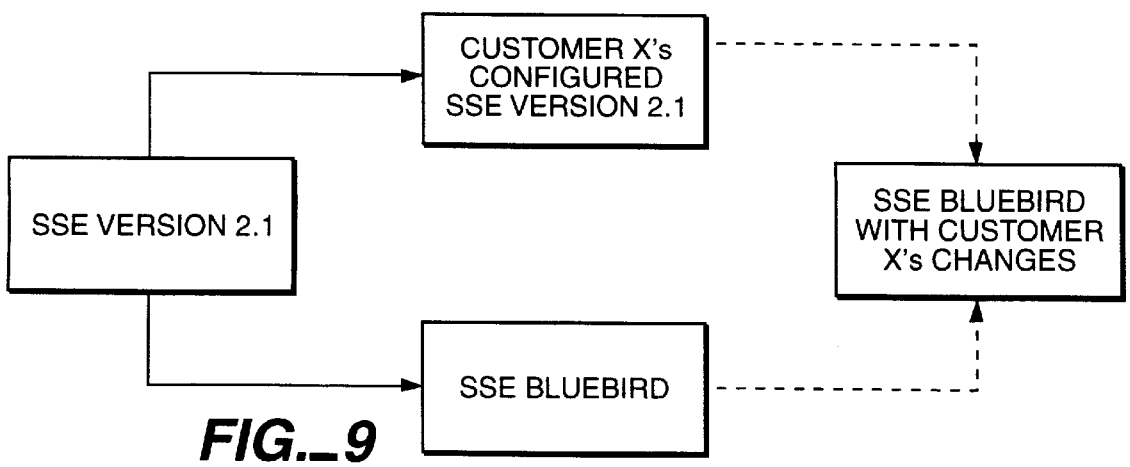
FIG._9

METHOD OF UPGRADING A SOFTWARE APPLICATION IN THE PRESENCE OF USER MODIFICATIONS

CROSS REFERENCE TO RELATED APPLICATIONS

This application is a continuation application under the provisions of 35 USC §120 of PCT International Application No. PCT/US98/03575, filed Feb. 24, 1998, itself claiming the benefit of the filing date of U.S. Provisional Application No. 60/039,467 filed Feb. 27, 1997.

TECHNICAL FIELD

This invention relates to a system and method for providing updates to a network of partially replicated relational database systems and for providing efficient access to a database by a remote client using a networked proxy server. More particularly, it provides for a system and method of migrating to a successive level of a software distribution incorporating local modifications.

BACKGROUND

Relational databases are a commonly-employed data structure for representing data in a business or other environment. A relational database represents data in the form of a collection of two-dimensional tables. Each table comprises a series of cells arranged in rows and columns. Typically, a row in a table represents a particular observation. A column represents either a data field or a pointer to a row in another table.

For example, a database describing an organizational structure may have one table to describe each position in the organization, and another table to describe each employee in the organization. The employee table may include information specific to the employee, such as name, employee number, age, salary, etc. The position table may include information specific to the position, such as the position title ("salesman", "vice president", etc.), a salary range, and the like. The tables may be related by, for example, providing in each row of the employee table a pointer to a particular row in the position table, coordinated so that, for each row in the employee table, there is a pointer to the particular row in the position table that describes that employee's position. A relational database management system (RDBMS) supports "joining" these tables in response to a query from a user, so that the user making a query about, for example, a particular employee, may be provided with a report of the selected employee, including not only the information in the employee table, but also the information in the related position table.

Relational databases may be much more complex than this example, with several tables and a multiplicity of relations among them.

With the widespread use of inexpensive portable computers, it is advantageous to replicate a database onto a portable computer for reference at locations remote from the central computer. The replicated database may then be referenced by the user of the portable computer, without requiring reference to the main database, which may be maintained at a central location inconvenient to the user of the portable computer. However, there are a number of difficulties with the use of a replicated database.

One disadvantage is that a full copy of the central database may require more data storage than is desired or economical. For example, a salesman working in the field may need to refer to the database for information regarding sales opportunities in his sales area, but have no need to refer to any information regarding sales opportunities outside of his area. One possible approach to reduce the amount of required data storage is to simply replicate only that portion of the database that is needed by the user. However, this approach does not recognize that the criteria to determine which portions of the data are required is likely to vary over time. For example, the salesman may have a new city added to his territory. Under conventional approaches, the salesman would need to re-replicate his local copy of the database, this time selecting data including the added city. Such a practice is inconvenient, subject to error, and time-consuming.

A further disadvantage to a replicated database is the difficulties encountered in attempting to update data using the replicated copy. A change made to the replicated database is not made to the central database, leading to a discrepancy between the information that is stored in the replicated copy of the database and the information that is stored in the central database. Although it is possible to journal modifications made to the replicated copy and apply an identical modification to the central database, one problem that this approach faces is the possibility of colliding updates; that is, where a user of a replicated copy makes a change to data that is also changed by a user of the central copy of by the user of another replicated copy.

In addition, the system, including the central database and replicated database, involves a considerable amount of software which is often customized to meet the needs of a particular enterprise. A great deal of effort is expended on configuring the software and writing custom modules and objects. If the software is upgraded to a new release, a considerable amount of programming time and effort are required to configure the new release and reimplement the customer-specific functionality of the earlier version.

It is therefore desirable to provide a capability to maintain one or more partially-replicated copies of a central database, in such a way that the degree of replication may be easily changed without requiring a refresh of the entire replicated database, and that permits updates to be coordinated among users of the central database and users of the partially replicated databases. Additionally, it is desirable to provide a facility which allows enterprises to rapidly migrate their changes from one version of the software to another version of the software, such as configurations and objects.

SUMMARY OF THE INVENTION

The present invention is directed to a method of maintaining a partially replicated database in such a way that updates made to a central database, or to another partially replicated database, are selectively propagated to the partially replicated database. Updates are propagated to a partially replicated database if the owner of the partially replicated database is deemed to have visibility to the data being updated. Visibility is determined by use of predetermined rules stored in a rules database. In one aspect of the invention, the stored rules are assessed against data content of various tables that make up a logical entity, known as a docking object, that is being updated.

In another aspect of the invention, the stored rules are assessed against data content of one or more docking objects that are not necessarily updated, but that are related to a docking object being updated. In one embodiment, the visibility attributes of the related docking objects are recursively determined.

In yet another aspect of the invention, changes in visibility are determined to enable the central computer to direct the nodes to insert the docking object into its partially replicated database. Such changes in visibility are determined so as to enable the central computer to direct a node to remove a docking object from its partially replicated database.

In a further aspect of the invention, the predetermined rules are in declarative form and specify visibility of data based upon structure of the data without reference to data content.

In still another aspect of the invention, the transactions made to the database are ordered and processed in such a way as to reduce the computational resources required to calculate the visibility of the transactions.

In another aspect of the invention, a facility is provided to allow an enterprise to rapidly migrate its changes in one version of the software to another version of the software.

In yet another apsect of the invention, provision is made for migrating customized ODF and RC files from a previous version into a new release.

These and other aspects of the inventions will become apparent to one skilled in the art by reference to the following drawings and detailed description.

BRIEF DESCRIPTION OF THE DRAWINGS

FIG. 1 depicts an overview of the operation of one embodiment of the present invention.

FIG. 2 depicts a database schema that shows the relationship of the various components that make up a Docking Object.

FIG. 3 depicts steps performed by an update manager to update a database.

FIG. 4 depicts steps performed by a Docking Manager to transmit and/or receive one or more transaction logs.

FIG. 5 depicts the steps performed by a merge processor to merge transaction log records into an existing database.

FIG. 6 depicts the steps performed by a log manager to prepare a partial transaction log.

FIG. 7 depicts the steps performed by a visibility calculator for calculating visibility for a docking object as invoked by a log manager.

FIG. 8 depicts the steps performed to synchronize a partially replicated database in response to a change in data visibility.

FIG. 9 depicts a schematic of a typical migration path performed by the method of the invention.

DESCRIPTION OF SPECIFIC EMBODIMENTS
Overview

FIG. 1 depicts an overview of the operation of one embodiment of the present invention. FIG. 1 depicts a central computer system 1 and three remote computer systems (or "nodes") 21-a, 21-b, and 21-c. Each of nodes 21-a, 21-b and 21-c are depicted in various states of communication with central computer system 1, as will be more fully explained. Central computer system 1 includes a central database 3, a docking manager 5, a merge processor 7 and a log manager 9. Central computer system 1 additionally optionally includes update manager 11 responsive to user input 13.

Node 21-a is a remote computer system, such as a mobile client such as a laptop computer. Node 21-a includes a partially replicated remote database 23-a, update manager 31-a responsive to user input 33-a, docking manager 25-a and merge manager 27-a. In operation, update manager is responsive to user input 33-a to make changes to remote database 23-a as directed by the operator of node 21-a. Updates made are recorded, or journaled, in node update log 35-a.

At some point at the convenience of the operator of node 21-a, node docking manager 35-a is activated, and enters into communication with central docking manager 5. Update log 35-a is taken as input by node docking manager 25-a, and provided to central docking manager 5. Central docking manager 5 creates a received node update log 19, which contains all the information that had been recorded in update log 35-a. Optionally, partial log 17-a is taken as input by central docking manager 5 and provided to node docking manager 25-a, as more fully described herein.

At some point in time, at the convenience of the operator of central computer system 1, merge processor 7 is activated. Merge processor 7 takes as input received node update log 19, and applies the updates described therein to central database 3. In the process of applying the updates from received node update log 19, merge processor journals the updates applied to central update log 15. Optionally, update manager 11, responsive to user input 12 makes additional changed to central database 3 as directed by the operator of central computer system 1. The updates made by update manager 11 are additionally journaled in central update log 15.

At some point in time, at the convenience of the operator of central computer system 1, log manager 9 is activated. Log manager 9 takes as input central update log 15 and produces as output a set of partial logs 17-a, 17-b and 17-c according to visibility rules as will be further described herein. Each of partial logs 17-a, 17-b and 17-c corresponds to one of nodes 21-a, 21-b and 21-c. When a node docking manager such as node docking manager 25-a enters into communication with central docking manager 5 and optionally requests transmission of its corresponding partial log, central docking manager 5 takes as input the appropriate partial log, such as partial log 17-a, and presents it to node docking manager 25-a. Node docking manager 25-a then replicates partial log 17-a as merge log 37-a.

At some point in the future, at the convenience of the operator of node 21-a, merge processor 27-a is activated. Merge processor 27-a takes as input merge log 37-a, and applies the updates described therein to partially replicated database 23-a.

In addition to node 21-a, FIG. 1 also depicts two additional nodes 21-b and 21-c. Node 21-b is depicted in communication with central computer 1. However, unlike node 21-a, the operator of node 21-b has requested only to send his updates to central computer system 1, and has not requested to be presented with changes made elsewhere to be made to his partially replicated database 23-b. This may be, for example, if the operator has an urgent update that must be made as soon as possible, but does not have the time to receive updates from other nodes. Accordingly, FIG. 1 shows only transmission of node update log 35-a from node docking manager 25-b to central docking manager 5, and no transmission from central docking manager 5 to node docking manager 25-b. Accordingly, the merge manager for node 21-b is not activated and is not shown.

Likewise, node 21-c is depicted as not in communication with central computer system 1. Accordingly, the docking manager for node 21-c is not activated and is not shown.

By the cycle described above, updates made by each of nodes 21-a, 21-b and 21-c are presented to central computer system 1, permitting central database 3 to be updated accordingly. In addition, each of the updates made by each of the nodes 21-*a,* 21-*b* and 21-*c,* as well as updates made on central computer system 1, are routed back to each of nodes 21-*a,* 21-*b,* and 21-*c,* thereby keeping each of partial databases 23-*a,* 23-*b* and 23-*c* in synchronization with each other and with central database 3.

Database Structure

The synchronization of central database 3 with node databases 23-*a,* 23-*b* and 23-*c* is performed using a construct called a Docking Object. A Docking Object consists of Member Tables (including one Primary Table), Visibility Rules, Visibility Events, and related Docking Objects.

A Member Table is a table of the relational database that makes up a docking object. When a docking object is propagated from central database 3 to one of node databases 23-*a,* 23-*b* or 23-*c,* the propagation takes the form of an insertion into each of the Member Tables associated with the particular docking object. Similarly, when a docking object is scheduled to be removed from a database, that removal consists of deleting records from the member tables associated with the docking object. For example, a docking object that represents a sales opportunity may include tables that represent the opportunity itself (e.g., named "S_OPTY"), the product whose sale is represented by the opportunity (e.g., named "S_OPTY_PROD"), the contact for the opportunity (e.g., named "S_OPTY_CONTACT"), etc. Each of these tables is said to be a member table of the "Opportunity Docking Object."

A Primary Table is a Member Table that controls whether a particular instance of a Docking Object is visible to a particular node. The Primary Table has a Primary Row-ID value that is used to identify a row of the Primary Table being updated, deleted or inserted. For example, the "Opportunity Docking Object" may have as a primary table the table S_OPTY. The row-id of that table, i.e., S_OPTY.row_id, is the Primary Row-ID for the Opportunity Docking Object.

A Visibility Rule is a criterion that determines whether a particular instance of a Docking Object is "visible" to a particular node 21. If a Docking Object is visible to a particular node, that node will receive updates for data in the Docking Object. Visibility Rules are of two types, depending on the field RULE_TYPE. A Visibility Rule with a RULE_TYPE of "R" is referred to as an SQL Rule. An SQL Rule includes a set of Structured Query Language (SQL) statements that is evaluated to determine if any data meeting the criteria specified in the SQL statements exists in the Docking Object. If so, the Docking Object is visible to the node. A Visibility Rule with a RULE_TYPE of "O" is referred to as a Docking Object Rule. A Docking Object Rule specifies another Docking Object to be queried for visibility. If the specified Docking Object is visible, then the Docking Object pointing to it is also visible.

A Related Docking Object is a Docking Object that is propagated or deleted when the Docking Object under consideration is propagated or deleted. For example, an Opportunity Docking Object may have related Docking Objects representing the sales contacts, the organizations, the products to be sold, and the activities needed to pursue the opportunity. When an Opportunity Docking Object is propagated from Central Database 3 to one of node databases 23, the related docking objects are also propagated.

FIG. 2 depicts a database schema that shows the relationship of the various components that make up a Docking Object. The schema is a meta-database, in that it does not describe the data being accessed in the database. Rather, the schema is a separate database that defines the structure of the database being accessed. That is, it is a database comprising tables that describe the relationships and data contexts of another database.

Each of the tables shown in FIG. 2 is a table in a relational database, and as such is in row-column form. Many columns represent fields that are common to all the illustrated tables. Such fields include for example, a ROW_ID to identify a particular row in the table, as well as fields to tack the date and time that a row was created and last modified, and the identity of the user who created or modified the row. In addition, each table contains fields specific to that table, and which are described in detail below.

Table S_DOBJ 61 describes the Docking Objects in an application. Table S_DOBJ 61 includes the fields OBJ_NAME and PRIMARY_TABLE_ID. Field OBJ_NAME defines the name of the Docking Object being described. Field PRIMARY_TABLE_ID is used to identify the primary table associated with this Docking Object.

Table S_DOBJ_INST 63 describes whether a particular instance of a Docking Object, described by table S_DOBJ 61, is present on a particular node's database. Table S_DOBJ_INST 63 includes the fields NODE_ID, DOBJ_ID and PR_TBL_ROW_ID. Field NODE_ID points to a particular node table 65. Field DOBJ_ID points to the Docking Object to which the Docking Object instance applies. Field PR_TBL_ROW_ID is used to select a particular row in the Primary Table of the Docking Object. This value identifies the Docking Object instance.

Table S_REL_DOBJ 67 describes the related Docking Objects of a particular Docking Object, described by table S_DOBJ 61. Table S_REL_DOBJ 67 includes the fields DOBJ_ID, REL_DOBJ_ID, and SQL_STATEMENT. Field DOBJ_ID identifies the Docking Object that owns a particular related Docking Object. Field REL_DOBJ_ID identifies the related Docking Object that is owned by the Docking Object identified by DOBJ_ID. Field SQL_STATEMENT is an SQL statement that may be executed to obtain the Primary ID value of the related Docking Object.

Table S_DOBJ_TBL 69 describes the member tables of a particular Docking Object, described by table S_DOBJ 61. Table S_DOBJ_TBL 69 includes the fields DOBJ_ID, TBL_ID, and VIS_EVENT_FLG. Field DOBJ_ID identifies the Docking Object that contains the member table described by the row. Field TBL_ID identifies the particular table in the database that is the member table described by the row. Field VIS_EVENT_FLG is a flag that indicates whether a change to this Docking Object can result in a visibility event. A value of "Y" indicates that a change can result in a visibility event; a value of "N" indicates that it cannot.

Table S_DOBJ_VIS_RULE 71 contains the visibility rules associated with a particular Docking Object. S_DOBJ_VIS_RULE 71 contains the fields DOBJ_ID, RULE_SEQUENCE, RULE_TYPE, SQL_STATEMENT and CHECK_DOBJ_ID. Field DOBJ_ID identifies the Docking Object with which a particular visibility rule is associated. Field RULE_SEQUENCE is a sequence number that indicates the sequence, relative to other visibility rules in table S_DOBJ_VIS_RULE 71, in which the particular visibility rule should be run. RULE_TYPE specifies whether the particular visibility rule is of type "R," indicating an SQL visibility rule or of type "O,"indicating a Docking Object visibility rule.

If RULE_TYPE is equal to "R," field CHECK_DOBJ_ID is not meaningful, and field SQL_STATEMENT contains an SQL statement that is evaluated using the Primary ROW-ID of the primary table associated with this Docking Object and a particular Node 21. If the SQL statement returns any records, the Docking Object is deemed to be visible to the Node 21 for which visibility is being determined.

If RULE_TYPE is equal to "O," both field CHECK_DOBJ_ID and field SQL_STATEMENT are meaningful. Field CHECK_DOBJ_ID specifies a docking object whose visibility should be determined. If the specified docking object is deemed to be visible, then the docking object associated with the visibility rule is also visible. Field SQL_STATEMENT contains a SQL statement that, when executed, returns the Row-ID of the docking object identified by CHECK_DOBJ_ID that corresponds to the docking object instance associated with the visibility rule.

Table S_APP_TBL 73 is an Application Table that describes all the tables used in a particular application. It is pointed to by table S_DOBJ_TBL 69 for each member table in a docking object, and by table S_DOBJ for the primary table in a docking object. S_APP_TBL 73 points to table S_APP_COL 75, which is an Application Column Table that describes the columns of data in a particular application. S_APP_TBL 73 points to table S_APP_COL 75 directly through a primary key and indirectly through such means as a Foreign Key Column Table 81, User Key Column Table 83, and Column Group Table 85. The relationship of an Application Table, Application Column Table, Foreign Key Column Table, User Key Column Table and Column Group Table are well known in the art and are not further described.

Update Processing

FIG. 3 depicts steps performed by an update manager 31 such as update manager 31-a, 31-b or 31-c in updating a database, such as a node database 23-a, 23-b or 23-c, responsive to user input. Execution of update manager 31 begins in step 101. In step 103, the update manager 31 accepts from the user input 33 in the form of a command requesting that the data in database 23 be altered. The request may be in the form of a request to delete a row of a table, to add a row to a table, or to change the value of a cell at a particular column of a particular row in a table. In step 105, using a well-known means, the update manager 31 applies the requested update to database 23. In step 107, the update manager 31 creates a log record describing the update and writes it to update log 35.

The contents of a log record describe the update made. Each log record indicates the node identifier of the node making the update, an identification of the table being updated, and an identification of the type of update being made, i.e., an insertion of a new row, a deletion of an existing row, or an update to an existing row. For an insertion, the log record additionally includes an identifier of the row being inserted, including its primary key and the values of the other columns in the row. For a deletion, the log record identifies the primary key of the row being deleted. For an update, the log record identifies the primary key of the row being updated, the column within the row being updated, the old value of the cell at the addressed row and column, and the new value of the cell.

After writing a log record in step 107, the update processor exits for this update. The foregoing description of the update processing preferably includes additional steps not material to the present invention, for example, to assure authorization of the user to make the update, to stage and commit the write to the database to allow for rollback in the event of software or hardware failure, and the like. These steps are well-known in the art and are not described further.

An update manager 11 executing in central computer system 1 operates in an analogous manner, except that it updates central database 3 and writes its log records to central update log 11.

Docking Processing

FIG. 4 depicts steps performed by a Docking Manager 25 such as Docking Manager 25-a, 25-b or 25-c to transmit and/or receive one or more transaction logs. Docking Manager 25 is invoked by the user of a remote node such as node 21-a, 21-b or 21-c, whereby the user requests that the node dock with central computer 1 to upload an update log such as update log 35-a to central computer 1, to download a partial log such as partial log 17-a, or both. Execution of Docking Manager 25 begins in step 121. In step 123, Docking Manager 25 connects with central computer 1 under the control of Central Docking Manager 5. This connection can be any connection that enables data exchange. It is anticipated that the most common form of a connection is a telephone line used in conjunction with a modem, but other forms of data connection, such as a Local Area Network or a TCP/IP connection may also be used. Step 125 checks to see whether the user has requested that node update log 35-a be uploaded to the Central Computer 1. If so, execution proceeds to step 127. If not, step 127 is skipped and control is given to step 129. In step 127, Docking Manager 25 uploads its update log to central computer 1. The upload may be accomplished with any known file transfer means, such as XMODEM, ZMODEM, KERMIT, FTP, ASCII transfer, or any other method of transmitting data. In step 129, Docking Manager 25 checks to see whether the user has requested that a partial log such as partial log 17-a be downloaded from Central Computer 1. If so, execution proceeds to step 131. If not, step 131 is skipped and control is given to step 133. In step 131, Docking Manager 25 downloads its partial log from central computer 1. The download may be accomplished with any known file transfer means, such as XMODEM, ZMODEM, KERMIT, FTP, ASCII transfer, or any other method of transmitting data. In step 133, having completed the requested data transfer, Docking Manager 25 exits.

Merge Processing

Merge processing is performed by a processor such as node merge processor 27-a, 27-b, or 27-c, or central merge processor 7. The merge process serves to update its associated database with a transaction that has been entered by a user of a computer remote from the computer where merge processing is being performed. Merge processing is analogous to update processing and is similar in form to update processing as previously disclosed with reference to FIG. 3, with three differences. First, the input to a merge processor is not an update entered directly by a user, but rather is a log file that is obtained from a computer remote from the computer where the merge is executing. A second difference is that, as shown by in FIG. 1, merge processing does not produce a log when performed at a node. The function of a log on a node is to record a transaction for propagation to Central Computer system 1 and thence to other nodes as required. A transaction that is the subject of a merge in a node has been communicated to Central Computer System 1, and there is no need to re-communicate it.

A third difference is that merge processing must be capable of detecting and resolving multiple conflicting transactions. For example, assume that a field contains the value "Keith Palmer." Assume further that a user at node 27-a enters a transaction to update that field to "Carl Lake," and a user at node 27-b enters a transaction to update the same field to "Greg Emerson." Without collision detection, data among various nodes may become corrupt. When the transaction for user 27-a is merged, the field is updated from "Keith Palmer" to "Carl Lake." Without collision handling, when the transaction for node 27-b is merged, the field would be updated to "Greg Emerson," and the central database would then be out of synch with the database of node 27-a. Furthermore, when merge processing is performed on each of nodes 27-a and 27-b, each node will update its database with the other's transactions, leaving at least one node out of synch with the other node and with central database.

Therefore, merge processing must also have a means of detecting collisions and correcting them. In the above example, a simple way to detect and correct a collision is to compare the value in the database to the value that the merge log reflects as being the previous value in the node database. If the two values do not match, Merge processor 7 may reject the transaction and generate a corrective transaction to be sent to the node from which the conflicting transaction originated. In the above example, when the transaction for node 27-b was presented to merge processor 7, merge processor 7 would compare "Keith Palmer," the prior value of the field as recorded by node 27-b to "Carl Lake," the present value of the field as recorded in central database 3. Detecting the mismatch, merge processor 7 may then generate a transaction to change the value "Greg Emerson" to "Carl Lake," and write that transaction to update log 15. In a subsequent docking operation, that transaction would be routed back to node 27-b to bring its database 23-b in synch with the other databases.

The above is one example of a collision and a resulting corrective action. Other types of collisions include, for example, an update to a row that has previously been deleted, inserting a row that has previously been inserted, and the like. Merge processing must detect and correct each of these collisions. This may be performed using any of a number of well-known methods, and is not discussed further.

FIG. 5 depicts the steps performed by merge processor such as central merge processor 7. Although it depicts merge processor 7 writing to central database 3 and to transaction log 15, it is equally representative of a node merge processor such as node merge processor 27-a, 27-b or 27-c updating a node database 23-a, 23-b or 23-c. Merge processing begins at step 141. In step 143, merge processor 7 finds the first unprocessed transaction on received log 19. In step 147, merge processor 7 selects a transaction from received log 19. In step 149, merge processor 149 attempts to update database 3 according to the transaction selected in step 147. In step 151, merge processor 7 determines whether the database update of step 149 failed due to a collision. If so, merge processor proceeds to step 153, which generates a corrective transaction. Following the generation of the corrective transaction, the merge processor returns to step 149 and again attempts to update database 3. If no collision was detected in step 151, execution proceeds to step 157. In step 157, merge processing checks to see if it is executing on central computer 1. If so, step 155 is executed to journal the transaction to log 15. In any case, either if step 157 determines that the merge processing is being performed on a node or after step 155, execution proceeds to step 159. Step 159 checks to see if any transactions remain to be processed from log 19. If so, execution repeats from step 147, where the next transaction is selected. If not, merge processing exits in step 161.

Log Management

FIG. 6 depicts the steps to be performed by log manager 9 to prepare a partial transaction log such as partial transaction log 17-a, 17-b, or 17-c. The procedure depicted in FIG. 6 is executed for each node available to dock with central computer system 1. Log manager 9 begins execution in step 171. In step 173, Log Manager 9 finds the first unprocessed transaction for the node whose partial transaction log is being prepared. In step 175, log manager 9 selects a transaction for processing. In step 177, log manager 9 checks to see whether the selected transaction originated on the same node for which processing is being performed. If so, there is no need to route the transaction back to the node, and control proceeds to step 179. Step 179 checks to see whether there are any transactions remaining to be processed. If so, control is given again to step 175. If not, control passes to step 189, which records the last transaction that was processed for this node, and then exits at step 191. If the transaction originates in other than the same node as the node for which processing is being performed, control is given to step 181. Step 181 calls a visibility calculator to determine whether the selected transaction is visible to the node being processed. The Visibility calculator routine is described in detail further herein. In step 183, merge processor 9 checks to see whether the visibility calculator determined that the transaction is visible. If it is not visible, control is passed to step 179, which performs as disclosed above. If the transaction is visible, control is passed to step 185. Step 185 writes a record for this transaction to the partial transaction log for the node being processed, for example, partial transaction log 17-a for node 21-a. In step 187, the log manager 9 records the last transaction that was processed for this node, and then passes control to step 179, which determines whether to select additional transactions or exit, as disclosed above.

Visibility Calculation

FIG. 7 depicts a flowchart describing the process a visibility calculator for calculating visibility for a docking object as invoked by step 181 of log manager 9. The visibility calculator is called with the node-id of the node for which visibility is being calculated, the docking object for which the visibility is being calculated, and the row-id of the docking object whose visibility id being calculated. The visibility calculator uses this information, in conjunction with information obtained from meta-data stored in the schema depicted in FIG. 2, to determine whether a particular transaction that updates a particular row of a particular docking object is visible to a particular node.

The Visibility calculator begins execution at step 201. In step 203, the visibility calculator makes a default finding that the transaction is not visible. Therefore, unless the visibility calculator determines that a transaction is visible, it will exit with a finding of no visibility. In step 205, the visibility calculator selects the first visibility rule associated with the docking object. This is done by finding the table S_DOBJ_VIS_RULE 71 associated with the current Docking Object as pointed to by table S_DOBJ 61. In step 205, the visibility calculator selects the row of table S_DOBJ_VIS_RULE 71 with the lowest value for field RULE_SEQUENCE.

In step 207, the Visibility Calculator checks the field RULE_TYPE for a value of "R." The value of "R" indicates that the rule is a SQL visibility rule. If so, the Visibility Calculator proceeds to step 209. In step 209 the Visibility Calculator obtains a SQL statement from field SQL_STATEMENT and executes it. An example of such an SQL statement might be:

SELECT 'X' FROM S_OPTY_EMP
   WHERE OPTY_ID=:PrimaryRowId
     AND EMP_ID=:NodeId;

This SQL statement causes a query to be made of application table S_OPTY_EMP. The query selects any records meeting two criteria. First, the records selected must have a field OPTY_ID, which is a row id or key, equal to the Primary Row-ID of the Docking Object whose visibility is being determined. Second, the records selected must have a field EMP_ID, which may be for example, an identifier of a particular employee, equal to the NodeId of the node for whom visibility is being determined. In ordinary language, this SQL statement will return records only if a row is found in a table that matches employees to opportunities, where the opportunity is equal to the one being updated, and the employee to whom the opportunity is assigned is the operator of the node.

This is a simplistic example, provided for maximum comprehension. More complex SQL statements are possible. For example, the rule:

SELECT 'X' FROM
&Table_Owner.S_ACCT_POSTN ap
&Table_Owner.S_EMP_POSTN ep
WHERE ap.POSITION_ID=ep.POSITION_ID
  AND ep.EMP_ID=:NodeId;

This rule queries the tables S_ACCT_POSTN (which relates a particular account with a particular position in the organization that is responsible for the account) and S_EMP_POSTN (which relates what employee corresponds to a particular position). The condition "ap.POSITION_ID=ep.POSITION_ID" requires finding a row in the account-to-position table that has the same position as a row in the employee-to-position table. The condition "ep.EMP_ID=:NodeId" further requires that the selected row in the employee-to-position table also have an Employee ID equal to the ID of the user of the Node for which visibility is being determined. In ordinary language, this condition allows visibility if the employee occupies the position that has responsibility for the account in the docking object being updated.

There is no particular limit to the complexity of the conditions in the SQL statement used to evaluate visibility. Particular implementations of SQL may impose limitations, and resource considerations may make it desirable to use less complex statements, but these limitations are not inherent in the invention.

Step 211 evaluates whether the execution of SQL_STATEMENT in step 209 returned any records. If records were returned, this indicates that the Node for which visibility is being checked has visibility to the docking object being processed. Accordingly, if records are returned, the Visibility Calculator proceeds to step 213. In step 213, the transaction is marked visible. Because no further rules need to be evaluated to determine visibility, the visibility calculator proceeds to step 228. Step 228 synchronizes the databases by determining whether the calculated visibility requires the insertion or deletion of a docking object into a particular node's partially replicated database. This may occur, for example, if a node is determined to have visibility to a docking object due to a change to a related docking object. For example, an owner of a node may be assigned to a particular activity that is related to a particular sales opportunity. As a result, the node should be provided with a copy of the object representing the sales opportunity.

FIG. 8 depicts the steps performed to synchronize a partially replicated database in response to a change in data visibility. Execution begins in step 241. In step 243, the Visibility Calculator references the visibility just calculated for a docking object. If the Docking Object is visible, execution proceeds to step 245. Step 245 references the S_DOBJ_INST table, to verify that a row exists for the Docking Object for the current node. If a row exists, this indicates that the node in question already has a copy of the referenced Docking Object, and the routine proceeds to step 255, where it exits. If, however, no row exists for the Docking Object at the node being processes, this indicates that the node in question does not have a copy of the Docking Object on its partially replicated database. The routine then proceeds to step 247, where a transaction is generated to direct the node to insert the Docking Object into its partially replicated database.

If step 243 determines that the Docking Object is not visible, execution proceeds to step 249. Step 249 references the S_DOBJ_INST table, to verify that no row exists for the Docking Object for the current node. If step 243 determines that no row exists in the S_DOBJ_INST table for the current docking object for the current row, this indicates that the node in question does not have a copy of the referenced Docking Object, and the routine proceeds to step 255, where it exits. If, however, a row exists for the Docking Object at the node being processed, this indicates that the node in question does have a copy of the Docking Object on its partially replicated database. The routine then proceeds to step 251, where a transaction is generated to direct the node to delete the Docking Object from its partially replicated database.

Referring again to FIG. 7, following the data synchronization routine of step 228, the Visibility Calculator proceeds to step 229, where it exits. Referring to FIG. 6, as previously described, the resulting finding of visibility is available to be checked by the log manager in step 183 to determine to write the transaction.

Referring again to FIG. 7, if step 211 determines that no records were returned by the execution of the SQL statement in step 209, execution proceeds with step 215. Step 215 checks to see whether there are any remaining visibility rules to be assessed. If not, the visibility calculator proceeds to step 228 to synchronize the database, and then to step 229, where it exits. In this case, the default mark of no visibility that was set in step 203 remains set. This value will also be used by the log manager as shown in FIG. 6, step 183, to determine not to write the transaction.

Referring again to FIG. 7, if rules remain to be assessed, control proceeds to step 217, which selects the next rule to be processed. Control is then given again to step 207 to begin processing the new rule.

The preceding text provided a description of the processing or SQL visibility rule; that is, visibility rules of type "R." If step 207 determines that the visibility rule is not of type "R," the visibility rule is of type "O." Type "O" indicates a docking-object visibility rule. In such a case, the docking object being processed will be considered to be visible if it is related to a particular related docking object that is visible. If field RULE_TYPE is not equal to "R," then. execution proceeds to step 221. Step 221 determines the related Docking Object whose visibility must be determined to determine whether the current docking object is visible. The related Docking Object identifier is obtained from field CHECK_DOBJ_ID in table S_DOBJ_VIS_RULE 71. In step 223, the Visibility Calculator determines which row in the related Docking Object must be queried for visibility. In order to determine this, the Visibility Calculator obtains a predetermined SQL statement from the field SQL_STATEMENT and executes it. The SQL statement is a query that select one or more rows of the Docking Object that, for example, correspond to the docking object for which the Visibility Calculator was invoked.

For example, assume that it is desired to indicate that a record for a sales opportunity should be visible if the Node has visibility to any sales quote made for that sales opportunity. This may be accomplished using the following SQL statement:

SELECT"_ID" FROM
&Table_Owner.S_DOC_QUOTE
WHERE OPTY_ID=:Primary Rowld

This SQL statement accesses a table S_DOC_QUOTE that contains all sales quotes. The WHERE clause specifies retrieval of all rows where the Opportunity ID of the row is equal to the Row-ID of the opportunity for which visibility is being calculated. The Visibility manager retrieves the specified Row-Ids, thereby identifying the rows of the S_DOC_QUOTE table whose visibility must checked.

Having determined the a related docking object and the row-ID of that related docking object upon whose visibility the visibility of the current docking object depends, the Visibility Calculator proceeds to step 225. In step 225, the Visibility Calculator recursively invokes itself to determine visibility of the related docking object. The recursively invoked Visibility Calculator operates in the same manner as the Visibility Calculator as called from the Log Manager 9, including the capability to further recursively invoke itself. When the recursive call concludes, it returns a visibility indicator for the related Docking Object, and control proceeds to step 227. In step 227, the Visibility calculator determines whether the related Docking Object was determined to have been visible. If so, the Visibility Calculator proceeds to step 213 to mark the originally current Docking Object as visible, and then to step 228 to synchronize the database and then to step 229 to exit. If the related Docking Object was not determined to be visible, control proceeds to step 215 to determine whether additional visibility rules remain to be assessed.

The Visibility Calculator, in conjunction with the Log Manager is therefore able to determine what subset of update transaction data is required to be routed to any particular node. This operation serves to reduce the transmission of unneeded data from the Central Computer 1 to the various nodes such as nodes 21-*a,* 21-*b* and 21-*c* that utilize partially replicated databases, and to reduce the system resources such as disk space needed to store, and the CPU time needed to process, what would otherwise be required to maintain a fully replicated database on each remote node.

The operation of the log manager 9 in conjunction with the Visibility Calculator herein described will be apparent from reference to the description and to the drawings. However, as a further aid in the description of these facilities, a pseudocode representation of these facilities is hereto attached as an Appendix.

Application Upgrader

An Application Upgrader in accordance with the invention significantly reduces the time and cost of version upgrades by allowing enterprises to better determine what changes are available with each release and compare unique object customizations from prior releases with changes in the new release. The Application Upgrader notifies system administrators of conflicts between object customizations and new releases, automatically merges differences between object definitions, and allows administrators to manually override and apply any changes. The administrator will be able to better determine what has changed in the new release, compare object customizations with new changes delivered in the new release, and select which changes to apply, whether made by the customer or by the software developer in the new release. The Application Upgrader thus facilitates rapid application of previous customizations to a new release, improving the customer's ability to quickly absorb new technology and quickly roll out tailored production applications, and will be described by non-limiting reference to its use in a specific application; namely, an upgrade from SSE 2.1 to SSE Bluebird.

FIG. 9 depicts a schematic of a typical migration path. Using the Siebel Sales Enterprise (SSE) software as an example, FIG. 9 shows the evolution of the software along two distinct paths. In the first path, the software is configured and customized by a customer to produce Customer X's Configured SSE Version 2.1. In the second path, the software is developed to produce a new version called SSE Bluebird. The goal then becomes merging the customer's changes with SSE Bluebird, as indicated at the far right.

In an embodiment of the invention, the Application Upgrader (also called Business Object Upgrader) is configured to migrate customized ODF (Object Definition File) and RC (Resource) files into the new release. This Business Object Upgrader has several components:

GUI. The Graphical User Interface ties into an Object Explorer (described below) interface, with extensions to support visual comparison of differences between objects from two or more versions of the product. In addition, menu items and dialogs permit the administrator to initiate the difference and merge processes.

Difference Engine. This component compares two sets of Business Objects and creates a list of differences between the two.

Merge Engine. The merge process is similar to the difference process, except that a third common ancestor set of Business Objects is used to determine which differences are conflicting, and which are compatible. In addition, a facility for defining conflict resolution rules on a per-object basis may be created to reduce the number of conflicts that need to be manually resolved. Thus, referring to FIG. 9, the two sets under comparison would be from the Customer X's Configured SSE Version 2.1 and the SSE Bluebird, while the third common ancestor set would be from the SSE Version 2.1.

Reports Engine. A report engine produces reports that summarize the differences between sets of Business Objects.

ODF/RC File Readers. The pre-Bluebird business objects are configured via .ODF and .RC files, and thus must be imported into the Bluebird Business Object Repository before difference and merging operations can begin. The readers may be implemented as command-line utility programs, or be integrated with any Business Object Upgrader GUI.

Business Object Repository. This underlying object store supports the query and update operations needed for difference and merging multiple sets of objects.

OBJECT Explorer. The Object Explorer GUI provides access and editing of the business objects, and is the framework in which the Business Object Upgrader interfaces with the user.

Thus, the automated upgrader described above can handle the ODF and RC files and optionally others, as follows:

Business Object Definitions (.ODF files). These are the key object definitions that are upgraded by the Business Object Upgrader. The ODF import utility loads these into the repository. To keep the different product releases separate, different repositories in the same database with the same table-owner are used to hold the object definitions for each release, including the user's customized version of SSE 2.1.

Form Resources (.RC files). As a core piece of the repository, these files are loaded into the repository just like the ODF files, and are migrated using the same techniques.

Microsoft Help Files (.HLP/.CNT files).

RDBMS tables and their contents. A change to an object definition can trigger necessary changes in the default RDBMS upgrade script. For example, a customer may choose to migrate data that it had stored in extension columns into base product columns that were introduced in a new release. The Business Object Upgrader contains at least enough information to identify the corresponding RDBMS upgrade.

Microsoft Access Reports (.MDB files). Migration tools may be provided for customized Access reports.

String tables.

The generic difference and merge algorithms can be table-driven out of the meta-data in the repository. Object and object-type rules are defined as annotations in the repository tables. The table driven algorithms are described as follows:

Common Steps Performed by Both Difference and Merge Algorithms

To avoid needing to have hard-coded knowledge of specific object types and their attributes, the first step is to query the meta-data in the repository to collect the definitions of the various objects. The required steps are:

Instantiate a BusObj/BusComp for the Repository Types table. Query up the list of object types, which contains the name of the BusComp used to fetch each object type out of the repository.

Instantiate a BusObj/BusComp for the Repository Object Type. Acquire a list of Repository Object instances. There may need to be other hard-coded references to the Main and Project Object Types as well, in case the Main root object is required to query its children repository objects.

For each object type, instantiate the corresponding business component to collect the list of objects of that type, as well as the attribute values.

Difference Processing

Object names are the standard mechanism to determine if both Repositories have the same object. If the objects with the same name do exist, then a comparison of attributes occurs. If not, it is assumed that an Addition or Deletion operation has occurred.

The basic sweep through the Aparent-less@ objects in the repository is by object type, because it is assumed that the structure of the Projects in a repository cannot be relied upon to be consistent across versions. For example, all Business Objects are compared, then all Business Components are compared, and so on, in breadth-first search fashion.

Addition of a Aparent-less@ object such as a Business Component is fairly common, so there are typically many additional objects as well, for all the children objects of a Business Component. For a GUI presentation style of differences, all these changes may be grouped hierarchically under the top-level category of Added Business Component Foo@, rather than grouping the entire set of added objects in a breadth-first search summary of changes by object type.

Optimization: In the case of comparing versions of objects in the same repository, it should be possible to use the unique Object ID instead of the Object Name to determine if the Asame@ object has changed.

Merge Processing

A merge is essentially a combination of performing difference checks between a common ancestor version and each of the two revisions to be merged. The result will be two sets of differences, some of which are independent and others that are in conflict. The following section describes the various cases:

Conflict Scenarios

| Type of Difference | Normal Case | Conflict Case | Conflict Resolution |
| --- | --- | --- | --- |
| User Adds New Object | No impact | Bluebird adds Object with same name | Support adding both with forced rename of User's |
| User Changes Attribute | Conflict with V2.1 value | Conflict with V2.1 and Bluebird's value | Support User's change if attribute flag indicates it is superficial (e.g. labels) |
| User Deletes an Object | No impact | Bluebird references Object | Disregard User's Deletion |
| Bluebird Adds New Object | No impact | Conflict with User's name | See above |
| Bluebird Changes Attribute | No impact | Conflict with User's value | See above |
| Bluebird Deletes an Object | No impact | User references Object | Leave User reference dangling. |

The merge attributes (flags, etc.) mentioned above are stored in the repository along with the definitions of the specific object types and attributes.

The following examples of user scenarios illustrate the application of the Business Object Upgrader.

User With SSE 2.1 Upgrades to Bluebird

User has a Production 2.1 system, and a development 2.1 system. The Bluebird release CDROM is unloaded onto a new Bluebird development system, and the server database is loaded, including the seed data and repository. The basic configuration is started to ensure that A the basics@ work. The User's 2.1 ODF and RC files are imported (after running some preliminary steps required by the ODF Reader). The Business Object Upgrader can then be run to generate a new configuration. The parallel task is to create a new database from a recent backup of the production database, and apply the normal upgrade scripts to move the data to the Bluebird schema. The Business Object Upgrader can also be run from this environment to generate their Bluebird development system. Then at the time of deployment, the production system will be cut over from 2.1 to Bluebird.

Siebel Developer Merges Laptop Changes Into Master Repository

Mobile developers will be operating out of their local databases (i.e. Watcom), but their remote changes will need to be merged back into the main development database. The most unusual aspects of this case are that the destination of the merged results will also be one of the sources. Multiple simultaneous connections to different databases will be required, and in addition the merge results will need to be checked in as new revisions to existing objects. Before the merge results are applied, the necessary checkout locks are established before attempting to update any of the affected merged objects.

Multiple SSE configurations can reside in multiple databases and can be simultaneously accessed by the Business Object Upgrader. This is important for cross-database merging, particularly with mobile developers merging their changes back into a central database.

The baseline SSE 2.1 configuration can be loaded into the repository for a 3-way merge. The common ancestor is of particular utility in the merging process. The repository may be seeded with the SSE 2.1 Business Objects, or the Business Objects can be imported into the repository in a manner similar to the importation of the User's final 2.1 ODF files. Following is a description of some of the screens that are contained in Application Upgrader as applied to a Siebel software product.

Merge Repositories Dialog Box

The Merge Repositories dialog box is used to specify the repositories to be merged or compared. Access to the dialog box may be in the form of a selection on a pull-down menu, a button on another dialog box, or other means as are well-known in the art. This dialog box also brings up the Application Upgrader Object List screen in the background. The following table lists the Merge Repositories dialog box options:

Merge Repositories Dialog Box Options

| OPTION | DESCRIPTION |
| --- | --- |
| Merge Button | Initiates the merge or compare process. |
| Cancel Button | Cancels the current merge request and closes the Merge Repositories dialog box. The Application Upgrades Object List screen remains. |
| Advanced Button | Brings up the Merge Options dialog box. The box is described below. |
| Prior Repository | Standard Prior Siebel release. |
| Prior Customized Repository | Customized version corresponding to the Prior Siebel Repository. |
| New Standard Repository | New version v3.x Siebel release. |
| New Customized Repository | Final result of the merge process. |

Merge Options Dialog Box

The Merge Options dialog box is used to specify options to modify the merge process. The default settings are recommended settings. As with the Merge Repositories dialog box, this dialog box may be accessed by pull-down menus, buttons, or other means.

Merge Repositories Dialog Box Options

| OPTION | DESCRIPTION |
| --- | --- |
| Skip logging . . . Checkbox | Reduces the number of object differences to only high priority objects. High priority objects are v2.x objects that have been changed. Low priority objects are new v3.x objects that have been added. The default is TRUE to improve performance by not logging thousands of new v3.0 objects that would otherwise be logged to the results table. |
| OK Button | Accepts the changes to the merge options. |
| Delete UI objects . . . Checkbox | Enables the merge process to delete applet control objects and list column objects that have been deleted in the Prior Customized Repository. |
| Cancel | Cancels the current merge options request and closes the dialog box |
| Abort merge . . . | If more than the specified number of errors occur, the upgrade process automatically stops. This is useful when the administrator wants to avoid waiting for the entire merge process to complete when major problems have occurred. |

Application Upgrades Object List Screen

The Application Upgrades Object List screen lists the results of the merge process and is accessed via pull-down menus or other means.

Application Upgrades Object List Screen Lists

| LIST | DESCRIPTION |
| --- | --- |
| Application Upgrades | The top list shows the overview of the merge process. Only merge operations performed by the current user are shown. |
| Object Differences | The middle list shows the objects that were found to be different. By default, the most important object differences are shown first, with any errors at the very top. Any error information is displayed in the Status column. The various AIn . . . @ columns show which repositories contain the object. The AAdd To . . . @ column shows whether it was be copied into the Customer v3.x repository. |
| Attribute Differences | The bottom list shows the attributes of the current object that were found to be different. The Override flag can be checked if the administrator doesn't like the default resolution as shown in the Resolution field. |

The fields in the Object Differences list indicate common types of object differences. The table below describes four common type differences.

Common Object Type Differences from the Object Differences List

| COMMON OBJECT TYPE DIFFERENCE | CONFLICT | ADD TO NEW CUSTOMIZED | IN PRIOR STANDARD | IN PRIOR CUSTOMIZED | IN NEW STANDARD |
| --- | --- | --- | --- | --- | --- |
| Indicates an object that became obsolete in v3.0. | | | U | U | |
| Indicates an object added by the customer. | | U | | U | |
| Indicates an object that has | U | U | U | U | U |

-continued

| Common Object Type Differences from the Object Differences List | | | | | |
|---|---|---|---|---|---|
| COMMON OBJECT TYPE DIFFERENCE | CONFLICT | ADD TO NEW CUSTOMIZED | IN PRIOR STANDARD | IN PRIOR CUSTOMIZED | IN NEW STANDARD |
| been modified. The Attribute Differences list will then show the attribute differences. | | | | | |
| A new v3.x object. This will not be normally shown. To show these objects, the Skip Logging . . . checkbox on the Advanced Merge Options screen must be turned off. | | | | | U |

Application Upgrades Attribute List Screen

The Application Upgrades Attribute List screen lists the results of the merge process in a slightly different format than the Application Upgrades Object List screen, and is accessed via a pull-down menu or other means.

| Application Upgrades Attribute List Screen Lists | |
|---|---|
| LIST | DESCRIPTION |
| Application Upgrades | The top list shows the overview of the merge process. Only merge operations performed by the current user are shown. |
| Attribute Differences | The lower list shows the objects with their attributes that were found to be different. The Override flag can be checked if the administrator doesn't like the default resolution as shown in the Resolution field. By default, the most important object differences are shown first, with any errors at the very top. Any error information is displayed in the Status column. |

Viewing The Differences Between Repositories

The administrator can also use the Application Upgrader to perform a compare between repositories in order to view the differences without performing the merge process. The administrator can test a possible merge by creating a preview showing the differences between the three different object repositories, in the same manner as if a merge had been performed. The Application Upgrades screens can then be used to view and print the differences.

To run a test merge comparing three repositories, the following steps are performed:

Fill in all the fields in the Merge Repositories dialog box except for the New Customized Repository.

Click on the Merge button.

Use the Application Upgrades screens as in a normal merge, to view or print out a report that displays the differences between the three object repositories.

The Merge Repositories process can also be used to compare two repositories. This is useful to compare or summarize all changes made during a configuration. To compare two repositories, the following steps are performed:

Fill in the Prior Customized Repository and the New Standard Repository fields in the Merge Repositories dialog box.

Click on the Merge button.

Use the Application Upgrades screens as in a normal merge, to view or print out a report that displays the differences between the two object repositories.

CONCLUSION

Various modifications to these embodiments will be readily apparent to those skilled in the art, and the generic principles defined herein may be applied to other embodiments without the use of inventive faculty. Thus, the present invention is not intended to be limited to the embodiments shown herein, but is to be accorded the widest scope consistent with the principles and novel features disclosed herein.

All publications and patent applications mentioned in this specification are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing therefrom.

APPENDIX
Writing User Transaction Log File for a Given Laptop Node

This program will be called by a server-side process that processes transaction log entries for all Laptop Nodes. For each Laptop Node, the calling process is building the UserTrxnLogFileName and calling Program 1.

Input Parameters

- LaptopNodeId - node_id of the destination laptop
- UserTxnLogFileName - full path of the file where txns will be written
- MaxBatchTxns - number of txns between commits and updates to the S_DOCK_STATUS table
- MaxTxns - number of txns to process in this session. Use this parameter to limit processing.

Main Algorithm

```
-- Check parameters
IF (MaxTxns < 1 || MaxBatchTxns < 1) THEN
  Invalid Parameter
END IF -- Get last LOG_EXTRACT number for the Laptop from S_DOCK_STATUS
last_txn_commit_number = UTLDStatGetLogNum(LaptopNodeId);

-- Initialize Variables
NumTxns = 0;        -- Total number of txns processed
NumBatchTxns = 0;   -- Total number of txns written in the current batch -- Read Docking Object and Table definitions into memory structures
StartDictApi ();

-- Open the User Log Txn file
Open User Log Txn file

-- Select and process new txns in S_DOCK_TRANSACTION_LOG
-- where txn_commit_number > last_txn_commit_number
FOR each new txn LOOP -- Stop processing if reach MaxTxns
  IF NumTxns = MaxTxns THEN
    break;
  END IF;

-- Prevent circular txns. Do not send the txn back to the originating laptop
  IF txn.OriginNodeId = LaptopNodeId THEN
```

```
         Goto next transaction
         END IF;

-- Process all other types of transactions

-- This is the visibility calculator!
    5    -- This routine also processes implicit visibility events
         -- Later: Data Merge can call this function to check whether a txn is
         --   still visible when merging txns into a laptop or server database.
         CheckVisibility (LaptopNodeId, LogRecordType, TableName, TransRowId);
         IF txn is visible THEN
   10        -- Write transactions to UserTxnLog file depending on the
             -- type of LogRecordType.
             Write the txn to the user log file
             ++NumBatchTxns
         END IF;

15    -- Finished processing the txn
         -- Commit (if needed)
         IF NumBatchTxns = MaxBatchTxns THEN
             -- Assume that separate process comes around and deletes
             -- Txns in S_DOCK_TRANSACTION_LOG that have been processed
   20        -- for all nodes. So, no need to delete the txns from the log.
             Update last LOG_EXTRACT number for Laptop in S_DOCK_STATUS
             Commit;
             NumBatchTxns = 0
         END IF;

25    ++NumTxns
         End Loop; /* Each transaction in the Txn Log table */

-- Commit
         Update last LOG_EXTRACT number for Laptop in S_DOCK_STATUS
   30    Commit;

-- Close log file (if needed)
         IF UserTxnLogFileP != NULL THEN
           Close File;
         END IF;

35    StopDictApi ();
```

Check Visibility Routines

-- Check if a record in the txn log is visible to a LaptopNodeId
BOOL CheckVisibility (LaptopNodeId, LogRecordType, TableName, TransRowId)

```
    {
    -- SQLStatements routed based on the destination list
    IF LogRecordType in ('SQLStatement') THEN
      IF Laptop Node in destination list THEN
5       return TRUE;
      END IF;

-- Shadow and Multi Record LogRecordTypes are routed to all nodes
    -- No visibility events with these LogRecordTypes.
    ELSIF LogRecordType in ('ShadowOperation', 'MultiRecordDelete',
10                          'MultiRecordUpdate') THEN
      return TRUE;

-- Simple Deletes need more processing
    ELSIF LogRecordType in ('Simple Delete') THEN
15    IF (table.visibility in ('Enterprise', 'Limited')) THEN
          return TRUE;
      END IF;

-- Simple Inserts and Simple Updates need more processing
    -- CheckTxnVisibility() also processes implicit visibility events
20  ELSIF LogRecordType in ('Simple Insert', 'Simple Update') THEN
      IF (table.visibility = 'Enterprise') THEN
          return TRUE;
      ELSIF table.visibility = 'Limited' THEN
        IF CheckTxnVisibility (LaptopNodeId, Table, RowId) THEN
25        return TRUE;
        END IF;
      END IF;
    END IF;
    }

30  -- Check if a record in the txn log is visible to a LaptopNodeId
    static BOOL CheckTxnVisibility (LaptopNodeId, Table, RowId)
    {
      BOOL bVisible = FALSE;

Find the Table in the Dictionary;
35    IF Table not found THEN
        Error: Table not defined
      END IF;

FOR all docking objects that the table belongs to LOOP
        -- Generate SQL to get PrimaryId values of the Docking Object
40      GeneratePrimaryIdSQL (Table, RowId, DockingObject);
        FOR each PrimaryId value retrieved LOOP
```

```
        CheckObjectVisibility (LaptopNodeId, PrimaryTable, PrimaryRowId)
        IF object is visible THEN
            -- Because CheckObjectVisibility() also processes implicit
            -- visibility events, we must loop through ALL docking objects
5           -- even if we already know that the Txn is visible.
            -- Exception: if the table has VIS_event_FLG = 'N'
            --  then we can return immediately.
            IF Table.visibilityEventFLG = 'N' THEN
                return TRUE;
10          ELSE
                bVisible = TRUE;
            END IF;
        END IF;
    END LOOP;
15  END LOOP;

return bVisible;
    }

20  -- Check if an instance of a docking object is visible to the laptop user.
    -- Also processes implicit visibility events!
    BOOL CheckObjectVisibility (LaptopNodeId, DockingObjectName, PrimaryRowId)
    {
      FOR each visibility rule for the Docking Object LOOP
25      IF RuleType = RuleSQL THEN
          Run the select SQL statement using PrimaryRowId;
          IF any rows returned THEN
            -- row is visible
            -- Process an implicit Download Object
30              DownloadObjectInstance (LaptopNodeId, PrimaryTableName,
                                    PrimaryRowId);
            return TRUE;
          END IF;
        ELSIF RuleType = CheckDockingObject THEN
35        Run the ParameterSQL using PrimaryRowId to get newPrimaryRowId
          FOR each record retrieved by ParameterSQL LOOP
            -- RECURSIVE!
            CheckObjectVisibility (LaptopNodeId, CheckDockingObjectName,
                                    newPrimaryRowId);
40          IF rc = TRUE THEN
                -- Process an implicit Download Object
                DownloadObjectInstance (LaptopNodeId, PrimaryTableName,
                                    PrimaryRowId);
            return TRUE;
```

```
        END IF;
      END LOOP;
    END IF;
  END LOOP;

-- Object is not visible.

-- Process an implicit Remove Object
  RemoveObjectInstance (LaptopNodeId, PrimaryTableName, PrimaryRowId);

return FALSE;
}
```

Generate SQL Statement to Get PrimaryId

```
-- Generate the SELECT SQL statement to get the PrimaryId value of
-- the docking object for the given MemberTable
--
-- SQL statement looks like:
--   SELECT tp.<row_id>
--     FROM <table_owner>.<Table> t1,
--          <table_owner>.<PKTable> t2,
--          ... one or more intermediate tables between the table
--              and the PrimaryTable
--          <table_owner>.<PKTable> tN
--              <table_owner>.<PrimaryTable> tp
--    WHERE t1.ROW_ID = :row_id /* row_id in transaction log */
--      /* join to PK table t2 */
--      AND t1.<FKColumn> = t2.<PKColumn>
--      AND <t1 FKCondition>
--      /* any number of joins until reach the table that joins
--         to the PrimaryTable */
--      /* join from t2 to tN */
--      AND t2.<FKColumn> = tN.<PKColumn>
--      AND <t2 FKCondition>
--      /* join to the PrimaryTable */
--      AND tN.<FKColumn> = tp.<PKColumn>
--      AND <tN FKCondition>
--
-- Note that there may be one or more paths from the Member Table
-- to the Primary Table. We need to generate a SQL select statement
-- for each of the paths and UNION the statements together.
--
-- This function assumes that there are no loops in the definition.
--
-- These SQL statement do not change for each Table in a Docking Object,
```

```
         -- so we can calculate them one and store them in memory.
         --
         struct
         {
  5        CHAR* selectList;
           CHAR* fromClause;
           CHAR* whereClause;
           UINT numTables; /* also the number of joint to reach the Primary Table */
         } GenStmt;
 10

GeneratePrimaryIdSQL (Table, DockingObject)
         {
           /* there may be more than one SQL statement, so we have a dynamic
 15           array of SQL statements. Each element in the array is a path
              from the Table to the Primary Table*/
           DynArrId GenStmtArr;
           GenStmt newGenStmt;

CHAR* sqlStmt;
 20
           DynArrCreate (GenStmtArr);

-- Create the first element and initialize
           newGenStmt = malloc();
           newGenStmt.numTables = 1;
 25        newGenStmt.selectList = "SELECT row_id";
           newGenStmt.fromClause = "FROM <Table> t1";
           newGenStmt.whereClause = "WHERE t1.ROW_ID = :row_id";
           DynArrAppend (GenStmtArr, &newGenStmt);

/* Recursively follow FKs to the PrimaryTable */
 30           Build the select, from and where clause simultaneously */
           AddPKTable (Table, DockingObject, GenStmtArr, 0);

-- Union all the paths together
           numStmts = DynArrSize (GenStmtArr);
           FOR all elements in the array LOOP
 35           tmpSqlStmt = GenStmtArr[j].selectList|| GenStmtArr[j].fromClause ||
                       GenStmtArr[j].whereClause;
              sqlStmt = sqlStmt || 'UNION' || tmpSqlStmt;
           END LOOP;

DynArrDestroy (GenStmtArr);

40        IF sqlStmt = NULL THEN
```

```
            Error: no path from Table to Primary Table.
          END IF;
        }
5
        -- Recursively follow all FKs to the Primary Table
        AddPKTable (Table, DockingObject, GenStmt, InputStmtNum)
        {
          UINT numFKS = 0;
10        UINT StmtNum;
          GenStmt newGenStmt;

FOR all FKs for the table LOOP
            IF PKTable is a Member Table of the Docking Object THEN
                -- If there's more than one FK, then there is more than one path
15              -- out of the current table.
                -- Copy the SQL stmt to a new DynArrElmt to create a new path
              IF numFKs > 0 THEN
                  -- Create a new element and copy from GenStmt[InputStmtNum]
                  newGenStmt = malloc();
20                newGenStmt.numTables = GenStmt[InputStmtNum].numTables;
                  newGenStmt.selectList = GenStmt[InputStmtNum].selectList;
                  newGenStmt.fromClause = GenStmt[InputStmtNum].fromClause;
                  newGenStmt.whereClause = GenStmt[InputStmtNum].whereClause;
                  DynArrAppend (GenStmtArr, &newGenStmt);
25                StmtNum = DynArrSize (GenStmtArr);

-- Put a check here for infinite loops
                  IF StmtNum == 20 THEN
                      Error: Probably got an Infinite loop?
                  END IF;
30              ELSE
                  StmtNum = InputStmtNum;
              END IF;

-- Append the new PKTable to the fromClause and whereClause
              GenStmt[StmtNum].fromClause =
35                  GenStmt[StmtNum].fromClause || ",\n <Table> t<numTables + 1>";
              GenStmt[StmtNum].whereClause =
                      GenStmt[StmtNum].whereclause ||
                      "AND t<numTables>.<FKColumn> = t<numTables + 1>.<PKColumn>" ||
                      "AND <FKCondition for Table if any>";
40            ++GenStmt.numTables;

-- PKTable is the Primary Table then Done.
              IF PKTable = PrimaryTable THEN
```

```
            RETURN;
        ELSE
            AddPKTable (PKTable, DockingObject, GenStmt, StmtNum);
        END IF;

-- Only count FKs to other member tables in the same Docking Object
        ++numFKs;

END IF;
    END LOOP;

RETURN;
}
```

Process Visibility Events

```
-- Download an Object Instance to a Laptop
-- This function also downloads all Related Docking Object instances.
BOOL DownloadObjectInstance (LaptopNodeId, ObjectName, PrimaryRowId)
{
    -- Check if the object instance is already downloaded to the laptop
    Find the object instance in the S_DOBJ_INST table
    IF exists on laptop THEN
        return TRUE;
    END IF;

-- Register object instance in S_DOBJ_INST table

-- Write Download Object records to the Txn Log
    FOR each member table of the docking object LOOP
        Generate SQL select statement to download records
        Write each retrieved record to the User Txn Log file
    END LOOP;

-- Download records for Parent Object instances
    FOR each RelatedDockingObject LOOP
        Run ParameterSQL to get newPrimaryId of RelatedDockingObjects
        FOR each newPrimaryId retrieved LOOP
            -- Check if the instance of the object is visible to the laptop user
            CheckObjectVisibility (LaptopNodeId, ObjectName, PrimaryRowId)
            IF visible THEN
                DownloadObjectInstance (LaptopNodeId,
                        RelatedDockingObject, newPrimaryRowId);
            END IF;
        END LOOP;
    END LOOP;
```

```
         return TRUE;
      }

5   -- Remove an Object Instance to a Laptop
      -- This function also removes all Related Docking Object instances.
      BOOL RemoveObjectInstance (LaptopNodeId, ObjectName, PrimaryRowId)
      {
         -- Check if the object instance is already downloaded to the laptop
 10      Find the object instance in the S_DOBJ_INST table
         IF does not exist on laptop THEN
            return TRUE;
         END IF;

-- Delete the object instance from S_DOBJ_INST table
 15
         -- Write Remove Object records to the Txn Log
         FOR each member table of the docking object LOOP
            Generate SQL select statement to get records to delete
            Write each retrieved record to the User Txn Log file
 20      END LOOP;

-- Remove for Parent Object instances
         FOR each RelatedDockingObject LOOP
            Run ParameterSQL to get newPrimaryId of RelatedDockingObjects
            FOR each newPrimaryId retrieved LOOP
 25            -- Check if the instance of the object is visible to the laptop user
               CheckObjectVisibility (LaptopNodeId, ObjectName, PrimaryRowId)
               IF not visible THEN
                  RemoveObjectInstance (LaptopNodeId,
                           RelatedDockingObject, newPrimaryRowId);
 30         END IF;
            END LOOP;
         END LOOP;

return TRUE;
      }
```

We claim:

1. A method of upgrading a software application from a user modified prior version thereof to an upgrade version thereof, said software application having at least one attribute and wherein the user modified prior version includes user customized object definition files, said method comprising:
   a) querying the application attributes for each of
      i) an unmodified prior version,
      ii) the user modified prior version, and
      iii) the upgrade version of the software application;
   b) enumerating and comparing differences in attributes between
      i) the user modified prior version,
      ii) the unmodified prior version, and
      iii) the upgrade version of the software application;
   c) determining which differences in the attributes between the three versions of the software application are conflicting and which are compatible; and
   d) applying changes associated with the compatible attributes.

2. The method of claim 1 comprising displaying the conflicting changes for user selection.

3. The method of claim 1 comprising visually displaying compatible and conflicting object differences between the software applications.

4. The method of claim 1 wherein an installed version of the software contains user modifications, comprising comparing the installed user modified prior version and upgrade version of the software the unmodified prior version to determine which differences are conflicting and which are compatible.

5. The method of claim 1 further comprising selectively applying incompatible changes.

6. A program product residing on one or more computers and comprising:
   a computer usable medium having computer readable program code embodied therein for causing upgrading a software application from a user modified prior version thereof to a subsequent version, wherein the user modified prior version includes user customized object definition files, the computer readable program means comprising:
   a) computer readable program code for causing a computer to effect querying attributes in the software applications;
   b) computer readable program code for comparing differences in the attributes between the two versions of the software applications;
   c) computer readable program code for causing a computer to effect enumerating the differences in attributes between the two versions of the software applications;
   d) computer readable program code for causing a computer to effect determining which differences in attributes between the two versions of the software applications are conflicting and which are compatible; and
   e) computer readable program code means for causing a computer to effect making the changes associated with compatible attributes.

7. The program product of claim 6 further comprising computer readable program code for causing a computer to effect displaying the conflicting attributes for user selection.

8. The program product of claim 6 comprising computer readable program code for causing a computer to effect visually displaying compatible and conflicting differences between the software applications.

9. The program product of claim 6 comprising computer readable program code for causing a computer to effect comparing both versions of the application with an unmodified prior version to determine which differences are conflicting and which are compatible.

10. The program product of claim 6 further comprising computer readable program code to selectively apply incompatible changes.

11. A program storage device readable by a machine, tangibly embodying a program of instructions executable by a machine to perform method steps for upgrading a software application from a user modified prior version thereof to a subsequent version thereof, said software application having at least one attribute and wherein the user modified prior version includes user customized object definition files, said method steps comprising:
    a) comparing attribute differences between attributes of the two versions of the software applications;
    b) enumerating the attribute differences between the two versions of the software applications;
    c) determining which attribute differences between the two versions of the software are conflicting and which are compatible; and
    d) making the changes associated with compatible attributes.

12. The program storage device of claim 11 wherein said method steps further comprise selectively applying incompatible changes.

13. A method of upgrading a software application from a user modified prior version thereof, said software application having at least one attribute and wherein the user modified prior version includes user customized object definition files, to a subsequent version thereof, said method comprising:
    a) enumerating and comparing the attribute differences between the user modified prior version, an unmodified prior version, and the subsequent version of the software applications;
    b) determining which attribute differences between the three versions of the software are conflicting and which are compatible; and
    c) applying changes associated with compatible attributes.

14. A system for upgrading a software application from a user modified prior version thereof to an upgrade version thereof, said software application having at least one attribute and wherein the user modified prior version includes user customized object definition files, said system being configured to carry out the method comprising:
    a) querying the application attributes for each of
       i) an unmodified prior version,
       ii) the user modified prior version, and
       iii) the upgrade version of the software application;
    b) enumerating and comparing differences in attributes between
       i) the user modified prior version,
       ii) the unmodified prior version, and
       iii) the upgrade version of the software application;
    c) determining which differences in the attributes between the three versions of the software application are conflicting and which are compatible; and
    d) applying changes associated with compatible attributes.

15. The system of claim 14 wherein the system is a client-server system, and the upgrade is downloaded from the server to the client.

16. The system of claim 14 wherein the system is a single computer system.

17. The system of claim 14 wherein the system is further configured to display the conflicting changes for user selection.

18. The system of claim 14 wherein the system is further configured to visually display compatible and conflicting differences between the software applications.

19. The system of claim 14 wherein an installed version of the software contains user modifications, wherein the system is further configured to compare the installed user modified prior version and upgrade version of the software with the unmodified prior version to determine which differences are conflicting and which are compatible.

20. The system of claim 14 wherein the system is further configured to allow a user to selectively apply incompatible upgrades.

* * * * *